(12) United States Patent
Sugaya et al.

(10) Patent No.: US 7,775,926 B2
(45) Date of Patent: Aug. 17, 2010

(54) DIFFERENTIAL DEVICE FOR VEHICLE

(75) Inventors: Hiroaki Sugaya, Tochigi (JP); Masaaki Fusegi, Tochigi (JP)

(73) Assignee: GKN Driveline Torque Technology KK, Tochigi-Shi, Tochigi-Ken (JP)

( * ) Notice: Subject to any disclaimer, the term of this patent is extended or adjusted under 35 U.S.C. 154(b) by 329 days.

(21) Appl. No.: 12/098,267

(22) Filed: Apr. 4, 2008

(65) Prior Publication Data
US 2008/0254931 A1    Oct. 16, 2008

(30) Foreign Application Priority Data

Apr. 12, 2007  (JP) .......................... P2007-104676
Feb. 29, 2008  (JP) .......................... P2008-050917

(51) Int. Cl.
*F16H 48/26*    (2006.01)
(52) U.S. Cl. ......................................................... 475/85
(58) Field of Classification Search .................. None
See application file for complete search history.

(56) References Cited

U.S. PATENT DOCUMENTS 7,264,568 B2 *  9/2007  Ludwig et al. .............. 475/233

FOREIGN PATENT DOCUMENTS

JP    2004-211899    7/2004

\* cited by examiner

*Primary Examiner*—Dirk Wright
(74) *Attorney, Agent, or Firm*—Morrison & Foerster LLP

(57) ABSTRACT

A differential device includes a differential casing 15 having a cylindrical part 3, first and second sidewalls 5, 7 formed on both sides of the cylindrical part 3 and a flange part 13 formed on the outer circumference of the first sidewall 5, a differential mechanism 23 having a differential member 17 to which a driving force is transmitted from the differential casing 15 and first and second output members 19, 21 both engaged with the differential member 17 to distribute the driving force, a diff lock mechanism 29 having a clutch member 25 rotatable integrally with the first sidewall 5 and connectable with the first output member 19 by a relative movement of the clutch member 25 to the first sidewall 5 in the axial direction of the cylindrical part 3 and an actuator 27 for moving the clutch member 25 in the axial direction of the cylindrical part 3 and a differential restraint mechanism 33 having a frictional clutch 31 arranged on the side of the second sidewall 7, for restraining a relative rotation of the differential casing 15 to the second output member 21.

12 Claims, 7 Drawing Sheets

DIFFERENTIAL DEVICE FOR VEHICLE

BACKGROUND OF THE INVENTION

1. Field of the Invention

The present invention relates to a differential device for a vehicle.

2. Description of the Related Art

In prior art, Japanese Patent Laid-open Publication No. 2004-211899 discloses a differential device having a diff lock (differential locking) mechanism between one side gear and a differential casing and a differential restraint mechanism (or limited-slip differential mechanism) adopting a multiplate clutch between the other side gear and the differential casing. In this differential device, the limited slip differential is arranged on the side of a flange (i.e. part having a ring gear fixed thereto and receiving a driving force) formed in the differential casing.

SUMMARY OF THE INVENTION

Meanwhile, the differential locking mechanism is generally equipped with an actuator for operating the differential locking mechanism. Generally, the actuator is attached on one side opposite to the flange, the side including a spatial room in both axial and radial directions of the differential device.

With the above-mentioned structure, the differential device as one unit can be provided with both differential locking function and differential restraint function. However, if assembling such a differential device to a differential carrier (stationary housing), then the relative position of the differential carrier to the differential device is changed so as to project outward in the axial direction. As a result, there are caused necessities of altering a bearing span to support the differential device and renewing the differential carrier, deteriorating the mountability of the differential device.

Additionally, it is noted that the above differential restraint mechanism has to be arranged inside the flange in the radial direction of the differential casing. Thus, as the differential restraint mechanism is arranged in a bursiform space defined by a sidewall on the side of the flange and a circumferential wall of the differential casing. Therefore, under condition that a ring gear is attached to the flange, the multiplate clutch is apt to fall short of lubricating oil since the ring gear operates to mainly raise the lubricating oil against the circumference of the differential restraint mechanism.

Under a situation mentioned above, an object of the present invention is to provide a differential device accomplishing an appropriate distribution of lubricating oil against the differential restraint mechanism without deteriorating the vehicle mountability of the differential device.

According to the present invention, there is provided a differential device for a vehicle, comprising: a differential casing having a cylindrical part, a first sidewall and a second sidewall formed on both sides of the cylindrical part in an axial direction thereof, a first boss part and a second boss part formed outside the first and the second sidewalls in the axial direction and a flange part formed on the outer circumference of the first sidewall; a differential mechanism having a differential member to which a driving force is transmitted from the differential casing, and a first output member and a second output member both engaged with the differential member to thereby distribute the driving force; a diff lock mechanism having a clutch member rotatable integrally with the first sidewall and connectable with the first output member by a relative movement of the clutch member to the first sidewall in the axial direction of the cylindrical part and an actuator for moving the clutch member in the axial direction of the cylindrical part; and a differential restraint mechanism having a clutch arranged on the side of the second sidewall, for restraining a relative rotation of the differential casing to the second output member.

DETAILED DESCRIPTION OF THE PREFERRED EMBODIMENTS

Figure 1:
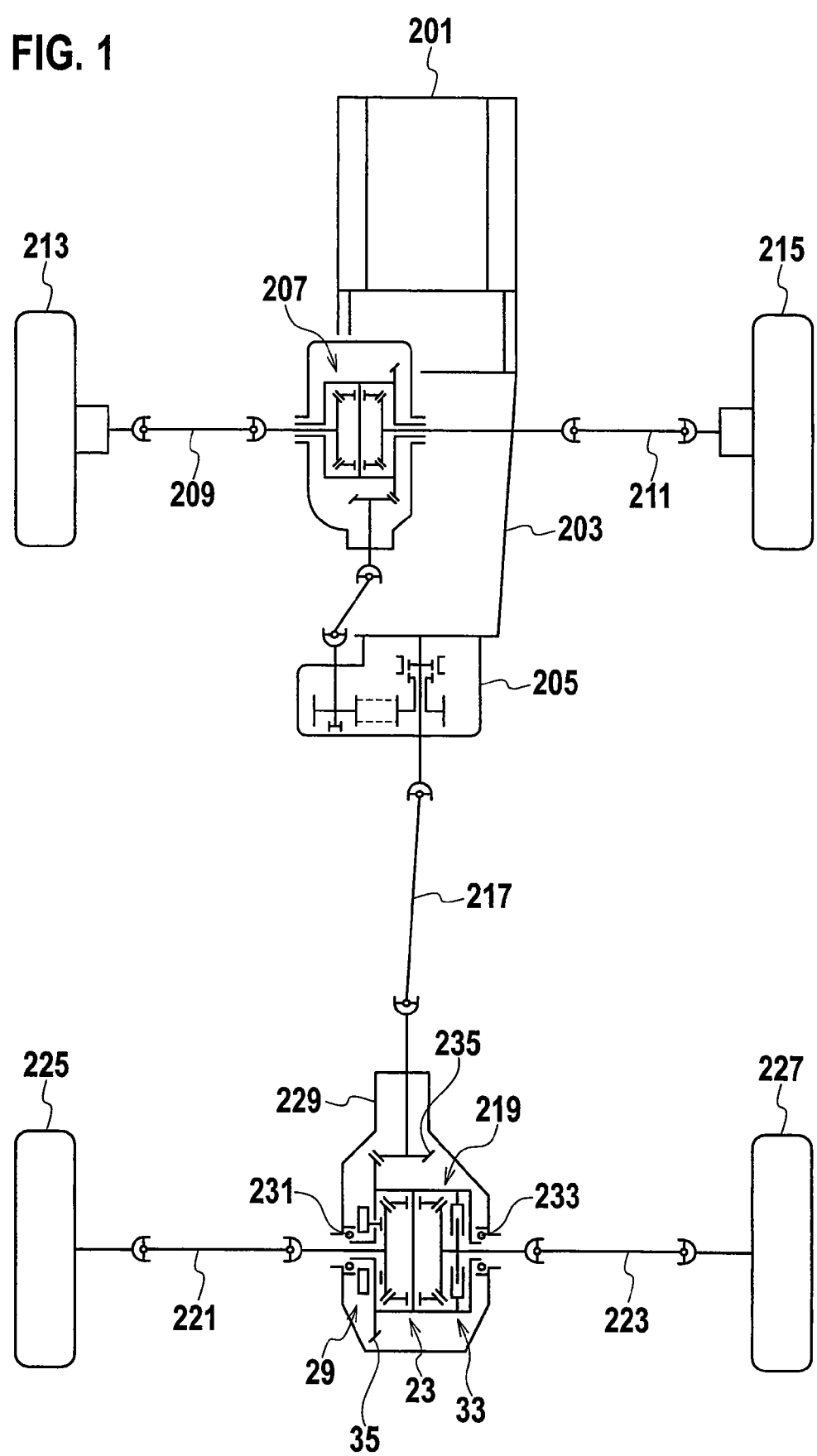
FIG. 1 is a schematic view showing a power transmission system of a vehicle.
Figure 2:
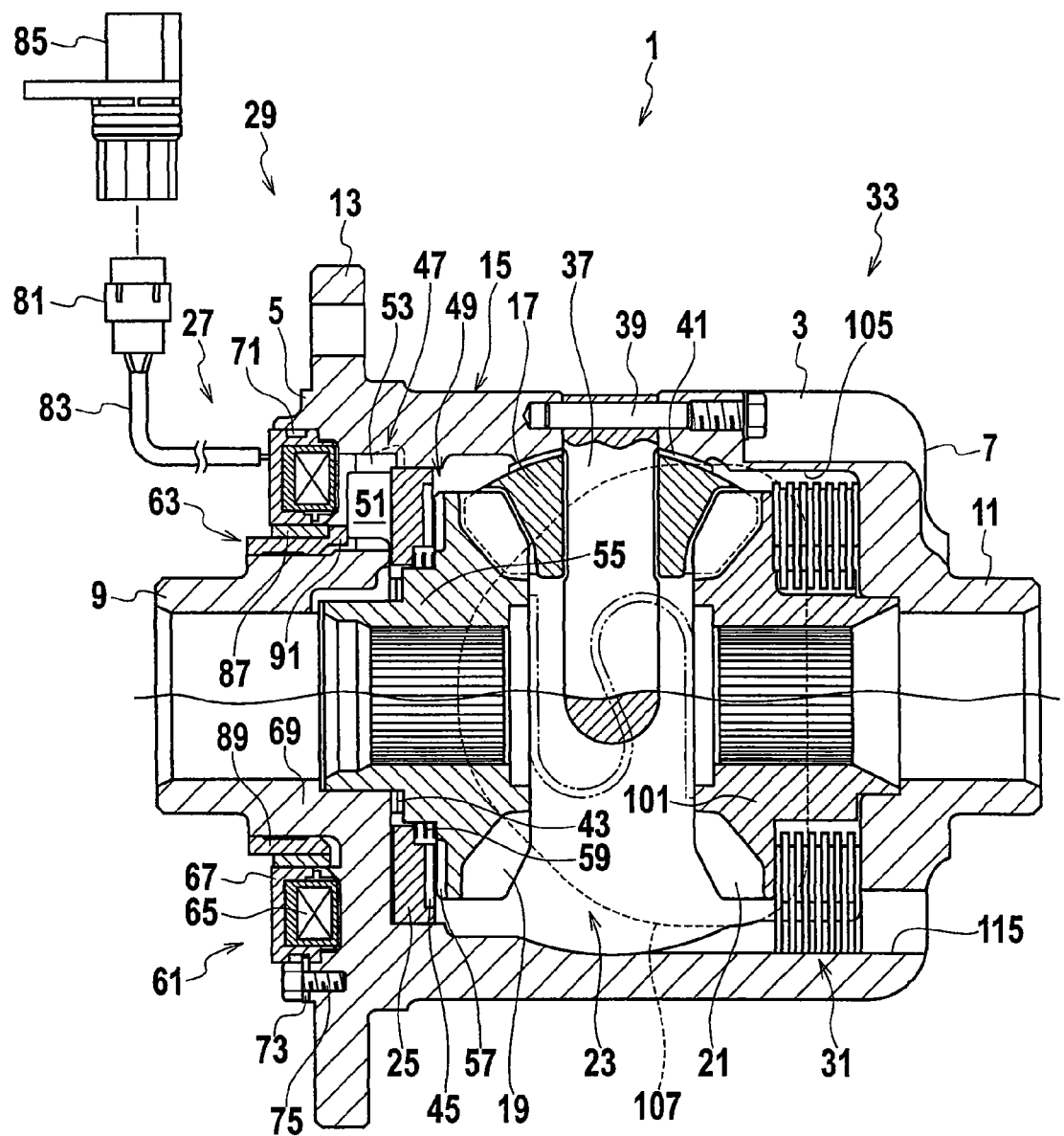
FIG. 2 is a sectional view of a differential device in accordance with a first embodiment of the present invention, showing a condition that a differential locking is released.
Figure 3:
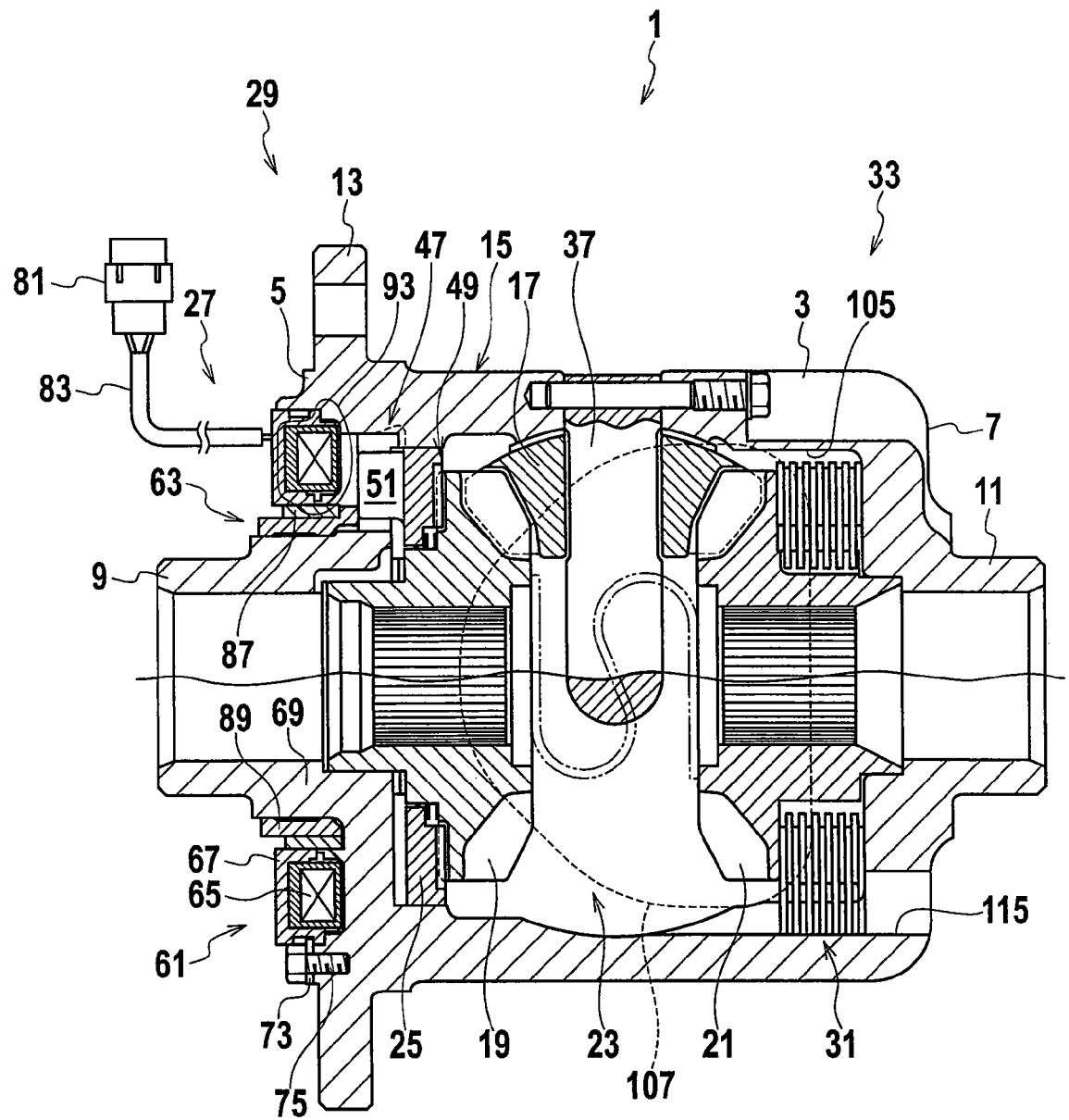
FIG. 3 is a sectional view of the differential device of the first embodiment, showing a condition that the differential locking is activated.
Figure 4:
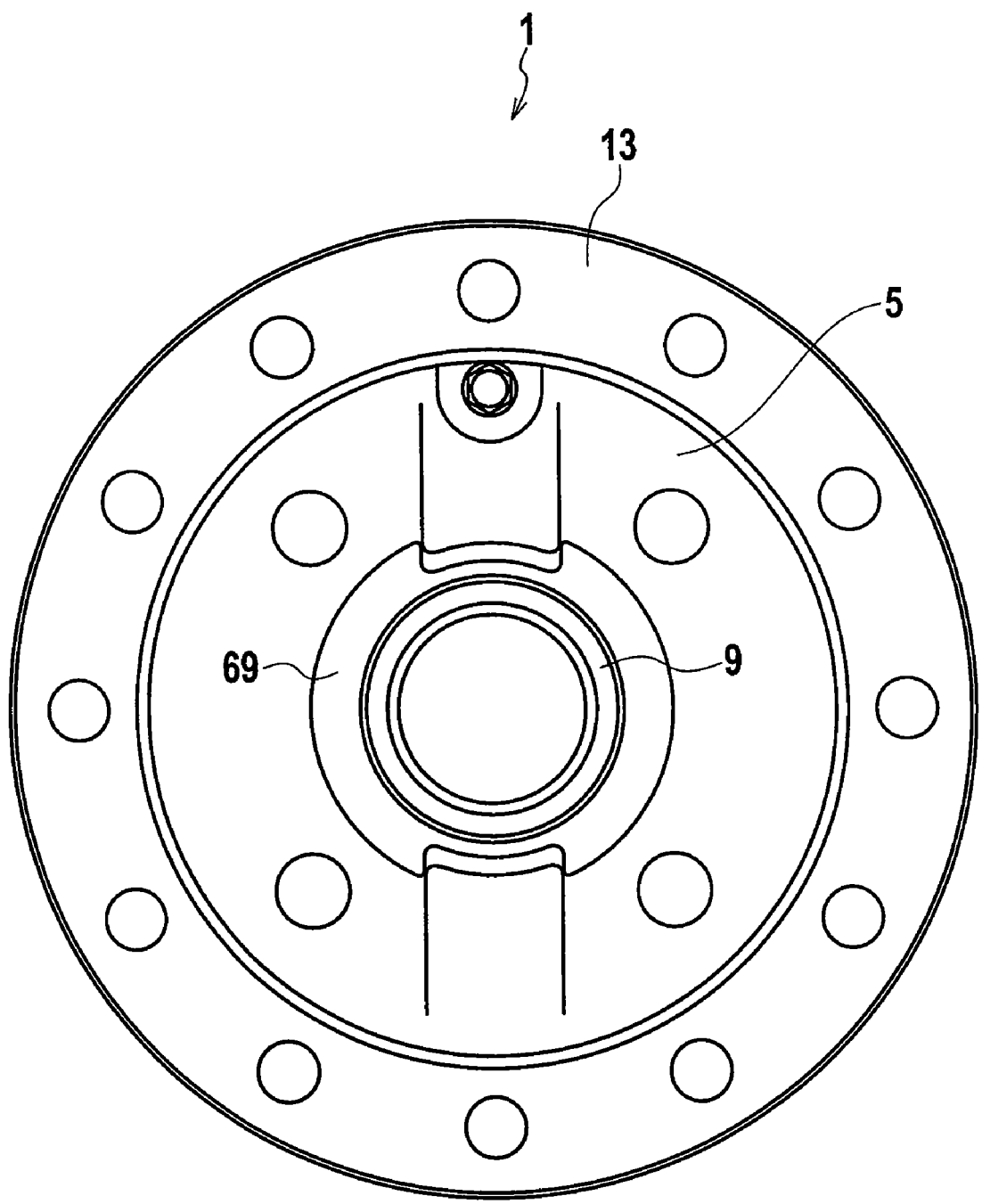
FIG. 4 is a side view of the differential device of the first embodiment.

First of all, we describe a power system of a vehicle on application of a differential device of an embodiment with reference to FIG. 1.

As shown in FIG. 1, the power system of this vehicle comprises a power source 201 (e.g. engine, electrical motor), a transmission 203 as a gearshift mechanism, a clutch mechanism 205, a front differential 207 as a differential device of the invention, front axles 209, 211, front wheels 213, 215, a propeller shaft (on rear wheels' side) 217, a rear differential 219 (also as the differential device), rear axles 221, 223, rear wheels 225, 227 and so on.

The driving force of the power source 201 is transmitted from the transmission 203 to the clutch mechanism 205. Then, the driving force is successively transmitted to the rear differential 219 through the intermediary of the propeller shaft 217 and finally distributed to the rear wheels 225, 227 through the rear axles 221, 223, providing a two-wheel driving condition in the rear drive. When the clutch mechanism 205 is coupled to the driving force, it is transmitted to the front differential 207 and further distributed to the front wheels 213, 215 through the front axles 209, 211, providing a four-wheel driving condition in the front/rear drive.

In the rear differential 219, its differential lock (diff lock) and differential restraint are performed by a diff lock mechanism 29 and a differential restraint mechanism 33. The front differential 207 may be equipped with the diff lock mechanism 29 and the differential restraint mechanism 33, although the illustrated vehicle has the diff lock mechanism 29 and the differential restraint mechanism 33 both arranged on the side of the rear differential 219 only. Hereinafter, the front differential 207 and the rear differential 219 will be referred to as "differential device 1" collectively.

1st. Embodiment

Referring to FIGS. 2 to 7, we now explain the differential device 1 in accordance with the first embodiment of the present invention.

The differential device 1 includes a differential casing 15, a differential mechanism 23, a diff lock mechanism 29 and a differential restraint mechanism 33. In detail, the differential casing 15 comprises a cylindrical part 3, a first sidewall 5 and a second sidewall 7 formed on both sides of the part 3 integrally, a first boss part 9 and a second boss part 11 formed on the first and the second sidewalls 5, 7 to the outside in the axial direction and a flange part 13 formed on the outer circumference of the first sidewall 15. The differential mechanism 23 comprises a pinion gear 17 (as a differential member of the invention) to which the driving force is transmitted from the differential casing 15, and a side gear 19 (as a first output member of the invention) and a side gear 21 (as a second output member) both engaged with the pinion gear 17 to distribute the driving force to axles (not shown) connected to the gears 19, 21. The diff lock mechanism 29 comprises a cam ring 25 (as a clutch member of the invention) rotatable integrally with the first sidewall 5 and connectable with the side gear 19 by the relative movement of the ring 25 to the sidewall 5 in the axial direction, and an actuator 27 for moving the cam ring 25 in the axial direction. The differential restraint mechanism 33 includes a frictional clutch 31 (as a clutch of the invention) for restraining a relative rotation between the differential casing 15 and the side gear 21.

More in detail, the differential restraint mechanism 33 comprises the frictional clutch 31, its connecting parts with the differential casing 15 and the side gear 21 and a meshing-reaction force applied on a gear part of the side gear 21.

As shown in FIGS. 2 to 7, the differential casing 15 comprises the cylindrical part 3, the first sidewall 5, the second sidewall 7, the first boss part 9, the second boss part 11 and the flange part 13.

The cylindrical part 3 is in the form of a hollow body and provided, on both sides in the axial direction with the first sidewall 5 and the second sidewall 7. On one side of the cylindrical part 3 in the axial direction, the first sidewall 5 is formed integrally with the part 3. The diff lock mechanism 29 is arranged on the side of the first sidewall 5. The first sidewall 5 is formed so as to extend from an axial end of the cylindrical part 3 into the inside in the axial direction. On the other side of the cylindrical part 3 in the axial direction, the second sidewall 7 is formed integrally with the part 3. The differential restraint mechanism 33 is arranged between the second sidewall 7 and the side gear 21 in the axial direction.

The first boss part 9 is formed so as to integrally project from the first sidewall 5 in the axial direction and rotatably supported by a differential carrier 229 (FIG. 1) through a bearing 231 (FIG. 1). The second boss part 11 is also formed so as to integrally project from the second sidewall 7 in the axial direction and rotatably supported by the differential carrier 229 (FIG. 1) through a bearing 233 (FIG. 1). The second boss part 11 is arranged so as to adjoin the frictional clutch 31 of the differential restraint mechanism 33 through the intermediary of the second sidewall 7.

On the circumferential side of the first sidewall 5, the flange part 13 is formed integrally with the cylindrical part 3. The flange part 13 has a ring gear 35 (FIG. 1) fixed thereto to engage with a drive pinion 235 (FIG. 1). In operation, the driving force of the power source 201 is transmitted to the ring gear 35 to rotate the differential casing 15 and also transmitted to the differential mechanism 23 accommodated in the casing 15.

The differential mechanism 23 comprises the differential casing 15, a pinion shaft 37, the pinion gear 17 and the side gears 19, 21 in pairs. The pinion shaft 37 has one end engaged with the differential casing 15 and is prevented from falling off the casing 15 by a pin 39. With this arrangement, the pinion shaft 37 rotates integrally with the differential casing 15. The pinion gear 17 serves to transmit the driving force to the side gears 19, 21 and is rotatably supported on the pinion shaft 37. Thus, if a differential rotation is produced between the side gears 19, 21, then the pinion gear 17 rotates on the pinion shaft 37. A spherical washer 41 is arranged between the pinion gear 17 and the differential casing 15.

The side gears 19, 21 in pairs are rotatably supported by the differential casing 15 and mesh with the pinion gear 17. A thrust washer 43 is interposed between the side gear 19 and the differential casing 15. The side gear 19 is provided, on the back side, with dog teeth 57 meshing with dog teeth 45 formed on the cam ring 25 of the diff lock mechanism 29.

The diff lock mechanism 29 comprises a cam mechanism 47, a dog clutch 49 and the actuator 27.

The cam ring 25 has a plurality of protrusions 51 formed at regular intervals in the circumferential direction of the ring 25. While, a plurality of cam grooves 53 are formed in the sidewall 5 of the differential casing 15, engaging with the protrusions 51 in the rotating direction of the differential casing 15. In assembling, the cam ring 25 is inserted in the differential casing 15 through an opening 107 formed in the casing 15. Inside the differential casing 15, the cam ring 25 has its outer circumferential part supported by the inner circumferential part of the differential casing 15 so as to be movable in the axial direction. Each of the protrusions 51 is formed with a cam face in the rotating direction of the cam ring 25. Similarly, each of the cam grooves 53 is formed with a cam face in the rotating direction of the differential casing 15. The cam face of the groove 53 is formed with an inclination angle equal to that of the cam face of the protrusion 51. In arrangement, the cam faces of the protrusions 51 engage with the cam faces of the cam grooves 53 in the rotating direction of the differential casing 15, providing the above cam mechanism 47. In operation, when the driving force acts on respective cam faces of the protrusions 51 and the cam grooves 53, the cam mechanism 47 is activated. Note, in the modification, the inclination angles of the cam faces may be modified to 0 degree, in other words, identical to the axial direction of the differential casing 15.

The dog clutch 49 comprises the dog teeth 45 of the cam ring 25 and the dog teeth 57 of the side gear 19. When the dog teeth 45 of the cam ring 25 mesh with the dog teeth 57 of the side gear 19, the differential casing 15 and the side gear 19 are connected to each other, establishing so-called "diff lock (differential locking)" state in the differential mechanism 23. Between the cam ring 25 and the side gear 19, a return spring 59 is arranged to urge the dog clutch 49 in the direction to release its meshing state. When the meshing state of the dog clutch 49 is released by the return spring 59, the diff lock state in the differential mechanism 23 is cancelled. The axial movement of the cam ring 25 for activating the dog clutch 49 is accomplished by a cam thrust force of the cam mechanism 47 and the axial movement of a movable member 63 in the actuator 27. Once the dog clutch 49 is activated, the resulting meshing state is stabilized since the cam ring 25 is strongly pressed in the direction to activate the dog clutch 49 due to the movement of the movable member 63 in the same direction and the cam thrust force of the cam mechanism 47.

The actuator 27 comprises an electromagnet 61, the above movable member 63, a controller (not shown) and so on. Note, the movable member and the clutch member may be constructed so as to be axially movable by using a cam mechanism arranged between two members relatively rotated by magnetic force of an electromagnet. Alternatively, these members may be axially moved by magnetic force of an electromagnet directly. Further, the connection/disconnection of clutch using the clutch member may be accomplished since an electromagnet is axially moved toward the differential casing due to a magnetic-line (flux) loop produced between a core of the electromagnet and the differential casing.

Figure 5:
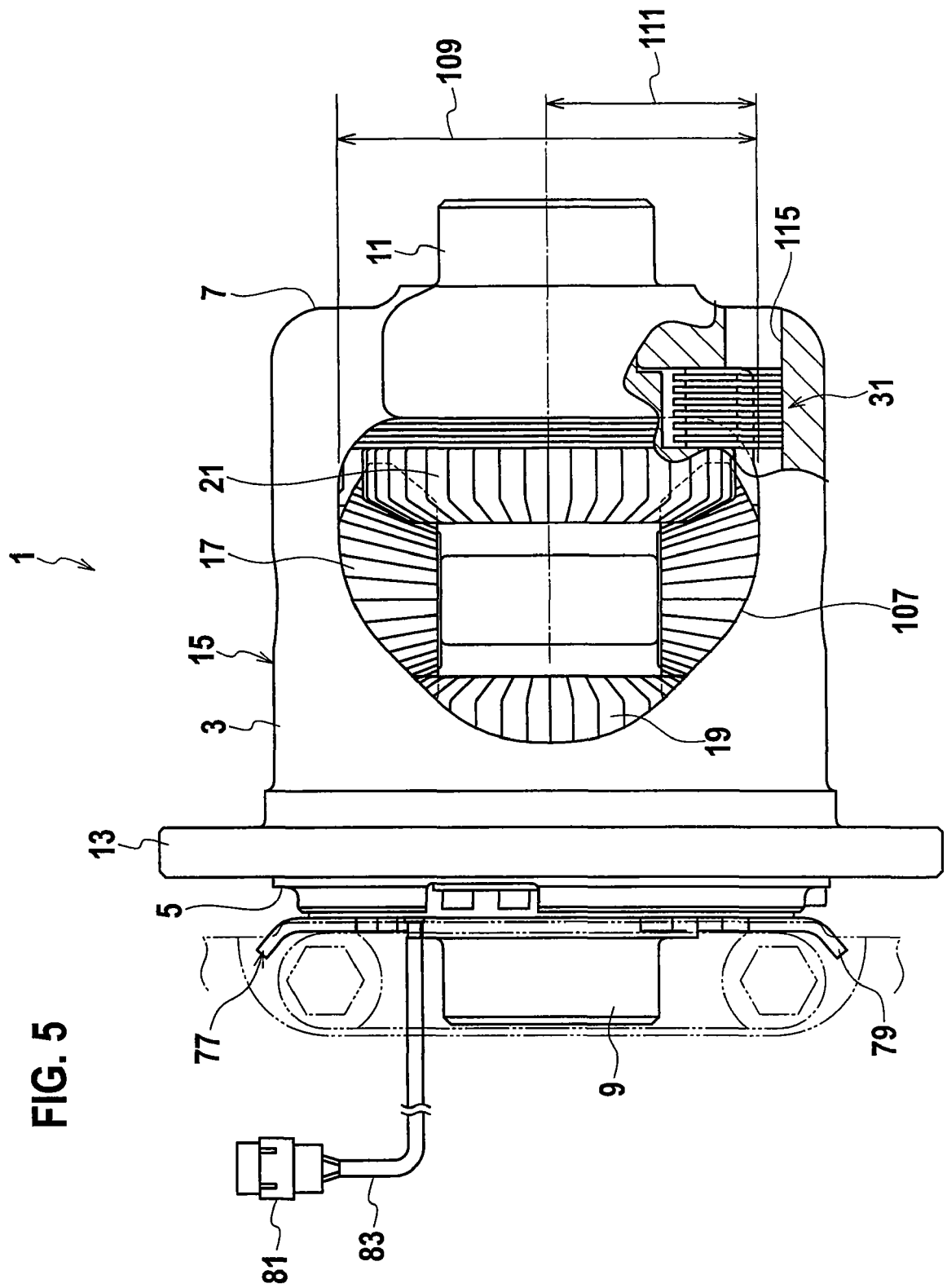
FIG. 5 is a front view of the differential device of the first embodiment.

The electromagnet 61 includes a coil 65 and a core 67. The coil 65 is molded in resin and further accommodated in the core 67. The core 67 is made from magnetic material. The core 67 is supported by a third boss part 69 in the radial direction, which is formed between the first sidewall 5 of the differential casing 15 and the first boss part 9. In arrangement, the flange part 13 overlaps with at least part of the third boss part 69 in the radial direction. Here, the definition of "overlap" means that the flange part 13 and a part of the third boss part 69 overlap with each other in the axial direction within a radial area including the flange part 13 and the part of the third boss part 69. The core 67 has a circumferential groove 71 formed on the outer circumference to receive an abutting member 73. The electromagnet 61 is held on the differential casing 15 in the axial direction by a bolt 75 for fixing the core 67 to the casing 15 through the abutting member 73 in the circumferential groove 71. Further, as shown in FIG. 5, the electromagnet 61 is provided with a whirl stop member 77 whose engagement part 79 is engaged with the differential carrier 229 to prevent the electromagnet 61 from whirling in the rotating direction. The so-mounted electromagnet 61 is electrically connected to one end of a lead wire 83. The other end of the lead wire 83 is connected to a connector 81. The connector 81 is further connected to another connector 85 on the side of a controller (not shown). Inside the electromagnet 61 in the radial direction, the movable member 63 is arranged so as to be movable in the axial direction by excitation of the electromagnet 61.

The movable member 63 consists of a plunger 87 and a ring 89. The plunger 87 is made from magnetic material, while the ring 89 is made from non-magnetic material. The ring 89 is fixed on the inner circumference of the plunger 87 to prevent magnetic lines of the electromagnet 61 from leaking to the differential casing 15. Additionally, the ring 89 is supported on the differential casing 15 movably in the axial direction and also provided with a projection 91 in abutment with the cam ring 25. In operation, if the plunger 87 is moved against the cam ring 25 due to a magnetic-line loop 93, which is formed by magnetic lines transmitted through the core 67, the first sidewall 5 and the plunger 87 by excitation of the electromagnet 61, then the projection 91 presses the cam ring 25 in the direction to activate the dog clutch 49. In addition to the above-mentioned diff lock mechanism 29, the differential device 1 is provided with a differential restraint mechanism 33 on the side of the second sidewall 7 of the differential casing 15.

Figure 6:
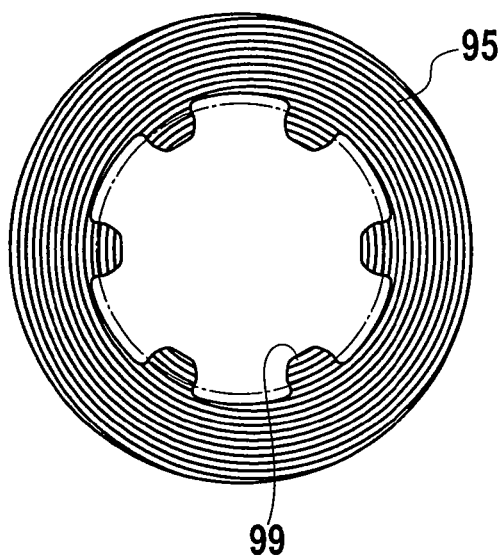
FIG. 6 is a front view of a frictional clutch.
Figure 7:
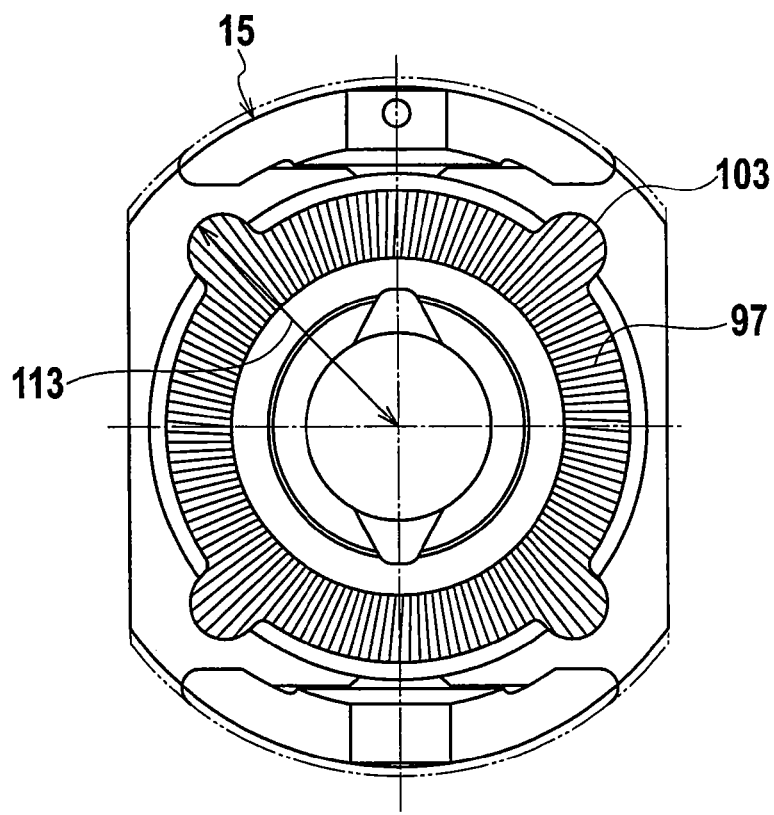
FIG. 7 is a front view of the frictional clutch being assembled in a differential casing.

The differential restraint mechanism 33 comprises a frictional clutch 31. The frictional clutch 31 includes a plurality of inner clutch plates 95 and a plurality of outer clutch plates 97. As shown in FIG. 6, each inner clutch plate 95 is spline-connected to the outer circumference of a boss part 101 of the side gear 21 through spline parts 99 on the inner circumference of the plate 95. As shown in FIG. 7, each outer clutch plate 97 has engagement projections 103 formed on the outer circumference. The engagement projections 103 are engaged with engagement grooves 105 formed on the inner circumference of the differential casing 15. When assembling, the so-constructed frictional clutch 31 is inserted into the differential casing 15 through an opening 107 formed in the cylindrical part 3. In the opening 107, its maximum length's part 109 (FIG. 5) is formed with a dimension enabling the frictional clutch 31 to be inserted into the differential casing 15 from its outside in the radial direction without either inclining or rotating the clutch 31. In detail, as shown in FIG. 5, it is established so that a radius 111 of the maximum length's part 109 becomes equal to or somewhat larger than a radius 113 (FIG. 7) of the outer clutch plate 97 extending from a plate center to the tip of the engagement projection 103. In connection, the maximum length's part 109 is formed in the cylindrical part 3 along the circumferential direction and also positioned on the side of the side gear 21 in the axial direction of the part 3.

In assembling, after inserting the frictional clutch 31 into the differential casing 15 from its outside in the radial direction through the opening 107, the engagement projections 103 are engaged with the engagement grooves 105 without rotating the frictional clutch 31. Successively, the frictional clutch 31 is moved in the differential casing 15 along the axial direction and finally located in a predetermined position between the differential casing 15 and the side gear 21. Under condition that the frictional clutch 31 is finally fixed in position in the differential casing 15, the frictional clutch 31 is partially exposed to the outside through the opening 107, allowing the clutch 31 to contact with lubricating oil. Additionally, the second sidewall 7 adjoining the frictional clutch 31 is provided with a hole 115 for lubrication. Using the opening 107 and the hole 115, it is possible to lubricate and cool down the frictional clutch 31, the spherical washer 41, the thrust washer 43 and respective meshing parts of the gears. In operation, if a differential rotation between the differential casing 15 and the side gear 21 exceeds a predetermined value, then the differential restraint mechanism 33 is subjected to a driving torque to be inputted to the differential casing 15. Consequently, corresponding to a dog (meshing) thrust force applied on the side gear 21 due to the engagement between the pinion gear 17 and the side gears 19 and 21, the frictional clutch 31 is activated (fastening state) to restrain the differential motion at the differential mechanism 23.

According to the first embodiment, as the differential device 1 has the actuator 27 arranged on the side of the flange part 13 and the frictional clutch 31 arranged on the opposite side of the flange part 13, there is no possibility that the differential casing 15 projects outward in the axial direction (i.e. protrusion of a relative position of the differential casing 15 with a differential unit), avoiding extensive modifications of differential bearings and a differential carrier. Thus, without aggravating the mountability of the differential device, it is possible to accomplish the lubricating operation for the differential restraint mechanism 33 appropriately.

Additionally, as the differential casing 15 is provided with the third boss part 69 for supporting the actuator 27, a coaxial degree of the actuator 27 with respect to the differential casing 15 is improved to allow the motion of the cam ring 25 to be stabilized.

As the third boss part 69 (at least its part) overlaps with the flange part 13 in the radial direction of the differential casing 15, it is possible to ensure a space for the actuator 27 without influencing the original position of the flange part 13.

Also, since the first sidewall 5 is formed so as to get from the end of the cylindrical part 3 into the differential mechanism 23 in the axial direction, it is also possible to ensure the space for the actuator 27 without influencing the original position of the flange part 13.

As the frictional clutch 31 and the second boss part 11 are close to each other on both sides of the second sidewall 7 in the axial direction, it is possible to suppress insufficient lubrication about the frictional clutch 31 that has been frequently caused with the conventional arrangement where the frictional clutch 31 is apart from the ring gear agitating the lubricating oil.

As the frictional clutch 31 is exposed to the outside through the opening 107 of the cylindrical part 3, the frictional clutch 31 of the differential restraint mechanism 33 is brought into direct-contact with lubricating oil, whereby the differential device 1 can be improved in its lubricating property and heat-radiation/cooling capability. Accordingly, the connecting/disconnecting performance of the frictional clutch 31 is not only stabilized but the heat damage on the clutch 31 can be suppressed. Furthermore, it is possible to miniaturize the frictional clutch 31. Especially, in case of a multiplate clutch, it is possible to reduce the plate thickness of each clutch plate as a constituent. In short, with a restrained rise in temperature, it is possible to stabilize the differential restraint function of the differential restraint mechanism 33, improving its durability.

Further, as the opening 107 is formed with dimensions enabling the frictional clutch 31 to be inserted into the differential casing 15 from the outside in the radial direction without either inclining or rotating the clutch 31, the differential device 1 can be improved in its assembling performance.

As the differential casing 15 is formed with the engagement grooves 105 that allow the frictional clutch 31 after being inserted into the casing 15 to be further moved along the axial direction of the casing 15 with no rotation, it is possible to easily accomplish the assembling of the frictional clutch 31 into the differential casing 15 in spite of the engagement projections 103 of the clutch 31.

Additionally, as the large-sized opening 107 is formed in the vicinity of the frictional clutch 31, it can be easily supplied with much lubricating oil, whereby the differential device 1 can be improved in the lubricating capability.

Since the first sidewall 5 constitutes a part of the magnetic-line loop 93 of magnetic lines, it is possible to miniaturize the actuator 27, improving the mountability of the differential device 1.

In the differential device 1, the clutch is not limited to only the illustrated multiplate clutch. It may be formed by a frictional clutch having a conical face formed between the differential casing and the side gear to produce a frictional function.

$2^{nd}$. Embodiment

Figure 8:
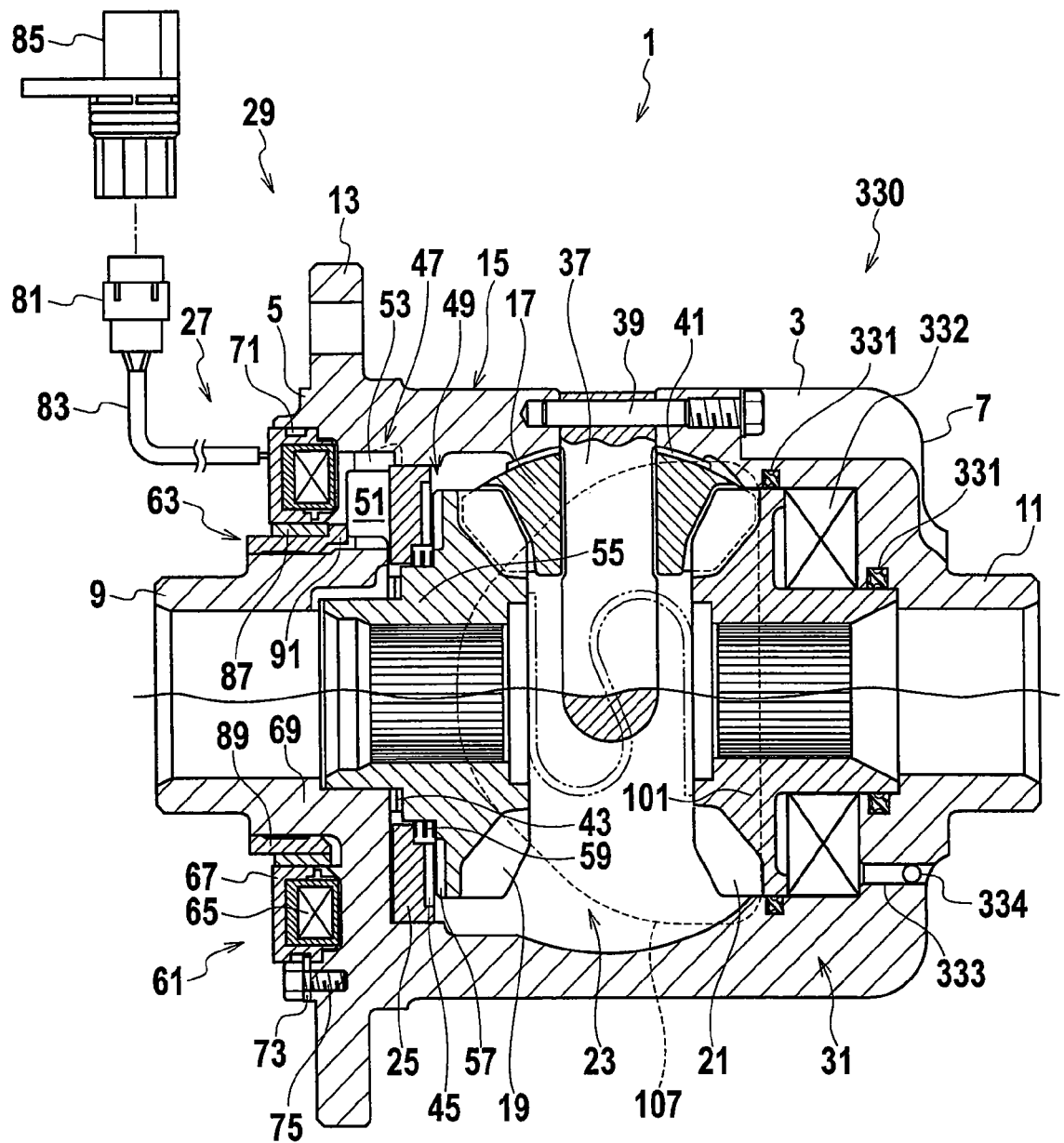
FIG. 8 is a sectional view of a differential device in accordance with a second embodiment of the present invention, showing a condition that a differential locking is released.

The second embodiment of the present invention will be described with reference to FIG. 8. In the second embodiment, elements similar to those of the first embodiment mentioned above are indicated with the same reference numerals, respectively. For simplification of the explanation, overlapping descriptions throughout these embodiments are eliminated except for differences from the first embodiment.

According to the second embodiment, there is adopted a fluid clutch utilizing fluid pressure, which may be referred to as "viscoupling", in place of the frictional clutch in the first embodiment. As shown in FIG. 8, the fluid clutch 330 comprises a plate chamber 332 accommodating respective inner plates formed on the outer circumference of a boss part 101 of the side gear 21 and outer plates formed on the inner circumference of the differential casing 15 alternately, an inlet 333 for supplying viscous fluid, such as silicon oil, into the plate chamber 332, a seal member 331 (e.g. X ring) for sealing up the plate chamber 332 filled up with the viscous fluid and a check ball 334. In operation, the fluid clutch 330 serves to restrain the differential motion corresponding to a torque produced between the inner plates and the outer plates due to a shear resistance of the viscous fluid.

With the above arrangement, similarly, as the differential device 1 has the actuator 27 on the side of the flange part 13 and the frictional clutch 31 (i.e. the fluid clutch 330) on the opposite side of the flange part 13, the differential restraint mechanism 33 as the fluid clutch can be mounted on the differential device 1 appropriately. As the fluid clutch, there may be adopted a mechanism combining lubricating oil (or exclusive oil) with a pump (e.g. gear pump, plunger, pump, etc.) in the modification.

Although we have describes the present invention by way of two embodiments, the present invention is not limited to these embodiments and therefore, various embodiments may be embodied by modifying the constituents without any departure from the gist of the present invention. For instance, although respective components of the differential casing 15 are formed into one body integral with each other in the above embodiments, one component (e.g. the first sidewall 5, the second sidewall 7, the cylindrical part 3, the flange part 13) may be divided into a plurality of component pieces in view of function of the differential device 1 itself, its cost and easiness in assembling. In this modification, the so-divided component pieces could be integrated by using fixing means, such as bolts and welding. Additionally, various inventions could be made by combining the constituents disclosed in the embodiments appropriately. Alternatively, some of the whole constituents disclosed in the embodiments may be eliminated in the modification. Further, constituents may be combined with each other over the different embodiments.

Repeatedly, it will be understood by those skilled in the art that the foregoing descriptions are nothing but embodiments and various modifications of the disclosed differential device and therefore, various changes and modifications may be made within the scope of claims.

This application is based upon the Japanese Patent Application No. 2008-050917, filed on Feb. 29, 2008, the entire content of which is incorporated by reference herein.

What is claimed is:

1. A differential device for a vehicle, comprising:
    a differential casing having a cylindrical part, a first sidewall and a second sidewall formed on both sides of the cylindrical part in an axial direction thereof, a first boss part and a second boss part formed outside the first and the second sidewalls in the axial direction and a flange part formed on the outer circumference of the first sidewall;
    a differential mechanism having a differential member to which a driving force is transmitted from the differential casing, and a first output member and a second output member both engaged with the differential member to thereby distribute the driving force;
    a diff lock mechanism having a clutch member rotatable integrally with the first sidewall and connectable with the first output member by a relative movement of the clutch member to the first sidewall in the axial direction of the cylindrical part and an actuator for moving the clutch member in the axial direction of the cylindrical part; and a differential restraint mechanism having a clutch arranged on the side of the second sidewall, for restraining a relative rotation of the differential casing to the second output member.

2. The differential device of claim 1, wherein
the differential casing further includes a third boss part formed between the first sidewall and the first boss part to support the actuator in the radial direction of the cylindrical part.

3. The differential device of claim 2, wherein
the third boss part has at least a part thereof overlapping with the flange part.

4. The differential device of claim 2, wherein,
the first sidewall is formed so as to extend from an axial end of the cylindrical part to an inside thereof in the axial direction.

5. The differential device of claim 3, wherein
the clutch and the second boss part are close to each other on both sides of the second sidewall in the axial direction of the cylindrical part.

6. The differential device of claim 1, wherein
the cylindrical part is provided with an opening through which the clutch is exposed to an outside.

7. The differential device of claim 1, wherein
the cylindrical part, the first sidewall, the second sidewall, the first boss part and the second boss part are formed into one body integral with each other; and
the cylindrical part is provided with an opening having dimensions enabling the clutch to be inserted into the cylindrical part from its outside in the radial direction.

8. The differential device of claim 7, wherein
the clutch has engagement projections formed on the outer circumference in the circumferential direction to be engageable with the differential casing; and
the differential casing has engagement grooves formed so as to allow the clutch after being inserted into the cylindrical part to be further moved in the cylindrical part along an axial direction thereof with no rotation of the clutch, the engagement grooves being engageable with the engagement projections respectively.

9. The differential device of claim 6, wherein
the opening has a maximum length's part formed in the cylindrical part along a circumferential direction thereof and positioned on the side of the second output member in the axial direction of the cylindrical part.

10. The differential device of claim 1, wherein
the actuator includes an electromagnet that generates magnetic lines to form a magnetic-line loop through the first sidewall thereby moving the clutch member in the axial direction of the cylindrical part.

11. The differential device of claim 1, wherein
the actuator is a frictional clutch disposed between the differential casing and the second output member.

12. The differential device of claim 1, wherein
the actuator is a fluid clutch disposed between the differential casing and the second output member.

* * * * *